United States Patent
Dey et al.

(10) Patent No.: US 10,608,965 B2
(45) Date of Patent: Mar. 31, 2020

(54) AUGMENTED CONVERSATIONAL AGENT

(71) Applicant: International Business Machines Corporation, Armonk, NY (US)

(72) Inventors: Kuntal Dey, Rampurhat (IN); Mohit Jain, Dhanbad (IN); Pratyush Kumar, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/826,353

(22) Filed: Nov. 29, 2017

(65) Prior Publication Data

US 2019/0166070 A1    May 30, 2019

(51) Int. Cl.
   *H04L 12/58*    (2006.01)
   *G06K 9/00*    (2006.01)

(52) U.S. Cl.
   CPC .......... *H04L 51/02* (2013.01); *G06K 9/00228* (2013.01); *G06K 9/00275* (2013.01); *G06K 9/00288* (2013.01); *G06K 9/00302* (2013.01); *G06K 9/00597* (2013.01)

(58) Field of Classification Search
   CPC .. G06F 9/453; G06F 3/04883; G06F 17/2785; G06F 16/90332; G06F 3/017; H04L 51/02; H04L 67/42; H04L 51/046; H04L 67/22
   See application file for complete search history.

(56) References Cited

U.S. PATENT DOCUMENTS

| | | | |
|---|---|---|---|
| 8,957,943 | B2 | 2/2015 | Nourbakhsh |
| 9,634,855 | B2 | 4/2017 | Poltorak |
| 9,812,151 | B1 | 11/2017 | Amini et al. |
| 2003/0212746 | A1 | 11/2003 | Fitzpatrick et al. |
| 2015/0042552 | A1 | 2/2015 | Tsoref |
| 2016/0124507 | A1 | 5/2016 | Singh |

(Continued)

OTHER PUBLICATIONS

Pelachaud, Catherine et al., "Multimodal Embodied Agents", 2001, 7 pages, ACM Digital Library.

(Continued)

*Primary Examiner* — Oanh Duong
(74) *Attorney, Agent, or Firm* — Ference & Associates LLC

(57) ABSTRACT

One embodiment provides a method, including: receiving, at a conversation agent, text-based input from a user and beginning a conversation between the user and the conversation agent; capturing at least one facial image of the user and analyzing the facial image to extract eye gaze information and facial expressions of the user; identifying, within the text based conversation, a concept of interest to the user, wherein the identifying comprises analyzing the eye gaze information to identify a position within the text-based conversation and determining the concept corresponding to the position within the text-based conversation; determining an emotion of the user in relation to the concept of interest, wherein the determining an emotion comprises analyzing the facial expressions of the user; and providing a text-based response to the user, wherein the text-based response is formulated in view of the determined emotion and the identified concept of interest.

20 Claims, 3 Drawing Sheets

(56) References Cited

U.S. PATENT DOCUMENTS

| | | |
|---|---|---|
| 2016/0164813 A1 | 6/2016 | Anderson et al. |
| 2016/0306844 A1 | 10/2016 | Frank et al. |
| 2017/0148073 A1 | 5/2017 | Nomula et al. |
| 2017/0235361 A1* | 8/2017 | Rigazio .................. B60K 35/00 715/710 |
| 2018/0096686 A1* | 4/2018 | Borsutsky ............... H04L 51/02 |
| 2018/0260854 A1* | 9/2018 | Balasubramanian ........................ G06F 17/277 |
| 2018/0365024 A1* | 12/2018 | Kiriakou ............. G06F 3/04847 |
| 2019/0026936 A1* | 1/2019 | Gorur Sheshagiri ..... G06T 7/70 |
| 2019/0098070 A1* | 3/2019 | Kim ...................... H04L 67/025 |

OTHER PUBLICATIONS

Bohus, Dan et al., "Managing Human-Robot Engagement with Forecasts and . . . um . . . Hesitations", ICMI '14, Nov. 12-16, 2014, Istanbul, Turkey, 8 pages, ACM Digital Library.

Altmann, Uwe et al., "Conversational involvement and synchronous nonverbal behaviour", Proceedings of the 2011 International Conference on Cognitive Behavioural Systems (COST '11), Feb. 21-26, 2011, Dresden, Germany, pp. 343-352, ACM Digital Library.

Oertel, Catharine et al., "Towards the Automatic Detection of Involvement in Conversation", Proceedings of the 2010 International Conference on Analysis of Verbal and Nonverbal Communication and Enactment (COST '10), Sep. 7-10, 2010, Budapest, Hungary, 11 pages, ACM Digital Library.

* cited by examiner

AUGMENTED CONVERSATIONAL AGENT

BACKGROUND

Many companies or entities use conversational systems, also referred to herein as chatbots, which allow users to interact with an online assistant. Chatbots typically conduct a conversation with the user in a manner similar to how another person would engage in the conversation. For example, a user may access an account and have a question regarding the information associated with the account. Rather than calling or emailing the account provider, the user may access a chatbot which allows the user to interact with an online assistant through the conversational system. As another example, some online retail shopping sites provide chatbots which allow a user to place an order for merchandise using the chatbot rather than calling.

BRIEF SUMMARY

In summary, one aspect of the invention provides a method, comprising: utilizing at least one processor to execute computer code that performs the steps of: receiving, at a conversation agent, text-based input from a user and beginning a text-based conversation between the user and the conversation agent, wherein the conversation agent comprises an interactive virtual agent that communicates with the user using a text-based communication method; capturing at least one facial image of the user and analyzing the facial image to extract eye gaze information and facial expressions of the user; identifying, within the text based conversation between the conversation agent and the user, a concept of interest to the user, wherein the identifying comprises analyzing the eye gaze information to identify a position within the text-based conversation and determining the concept corresponding to the position within the text-based conversation; determining an emotion of the user in relation to the concept of interest, wherein the determining an emotion comprises analyzing the facial expressions of the user; and providing, from the conversation agent, a text-based response to the user, wherein the text-based response is formulated in view of the determined emotion and the identified concept of interest.

Another aspect of the invention provides an apparatus, comprising: at least one processor; and a computer readable storage medium having computer readable program code embodied therewith and executable by the at least one processor, the computer readable program code comprising: computer readable program code that receives, at a conversation agent, text-based input from a user and beginning a text-based conversation between the user and the conversation agent, wherein the conversation agent comprises an interactive virtual agent that communicates with the user using a text-based communication method; computer readable program code that captures at least one facial image of the user and analyzing the facial image to extract eye gaze information and facial expressions of the user; computer readable program code that identifies, within the text based conversation between the conversation agent and the user, a concept of interest to the user, wherein the identifying comprises analyzing the eye gaze information to identify a position within the text-based conversation and determining the concept corresponding to the position within the text-based conversation; computer readable program code that determines an emotion of the user in relation to the concept of interest, wherein the determining an emotion comprises analyzing the facial expressions of the user; and computer readable program code that provides, from the conversation agent, a text-based response to the user, wherein the text-based response is formulated in view of the determined emotion and the identified concept of interest.

An additional aspect of the invention provides a computer program product, comprising: a computer readable storage medium having computer readable program code embodied therewith, the computer readable program code executable by a processor and comprising: computer readable program code that receives, at a conversation agent, text-based input from a user and beginning a text-based conversation between the user and the conversation agent, wherein the conversation agent comprises an interactive virtual agent that communicates with the user using a text-based communication method; computer readable program code that captures at least one facial image of the user and analyzing the facial image to extract eye gaze information and facial expressions of the user; computer readable program code that identifies, within the text based conversation between the conversation agent and the user, a concept of interest to the user, wherein the identifying comprises analyzing the eye gaze information to identify a position within the text-based conversation and determining the concept corresponding to the position within the text-based conversation; computer readable program code that determines an emotion of the user in relation to the concept of interest, wherein the determining an emotion comprises analyzing the facial expressions of the user; and computer readable program code that provides, from the conversation agent, a text-based response to the user, wherein the text-based response is formulated in view of the determined emotion and the identified concept of interest.

A further aspect of the invention provides a method, comprising: utilizing at least one processor to execute computer code that performs the steps of: initiating, upon receipt of input by a user, text-based conversational session between an interactive virtual agent and the user, wherein the interactive virtual agent communicates with the user using a text-based communication method; determining a facial expression of the user by capturing, using at least one image capture device, at least one facial image of the user; identifying, within the text based dialog between the virtual agent and the user, a portion of the dialog of interest to the user, wherein the identifying comprises accessing eye gaze information contained within the at least one image and identifying a location within the text based dialog corresponding to a position of the gaze of the user; determining an emotion of the user in relation to the portion of the dialog of interest, wherein the determining an emotion comprises comparing the determined facial expression of the user to known facial expressions having a corresponding identified emotion; and providing, from the virtual agent, a text-based response to the user by correlating the determined emotion to the identified concept of interest and generating a text-based response comprising a text concept corresponding to the identified concept of interest and formulated in view of the determined emotion.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
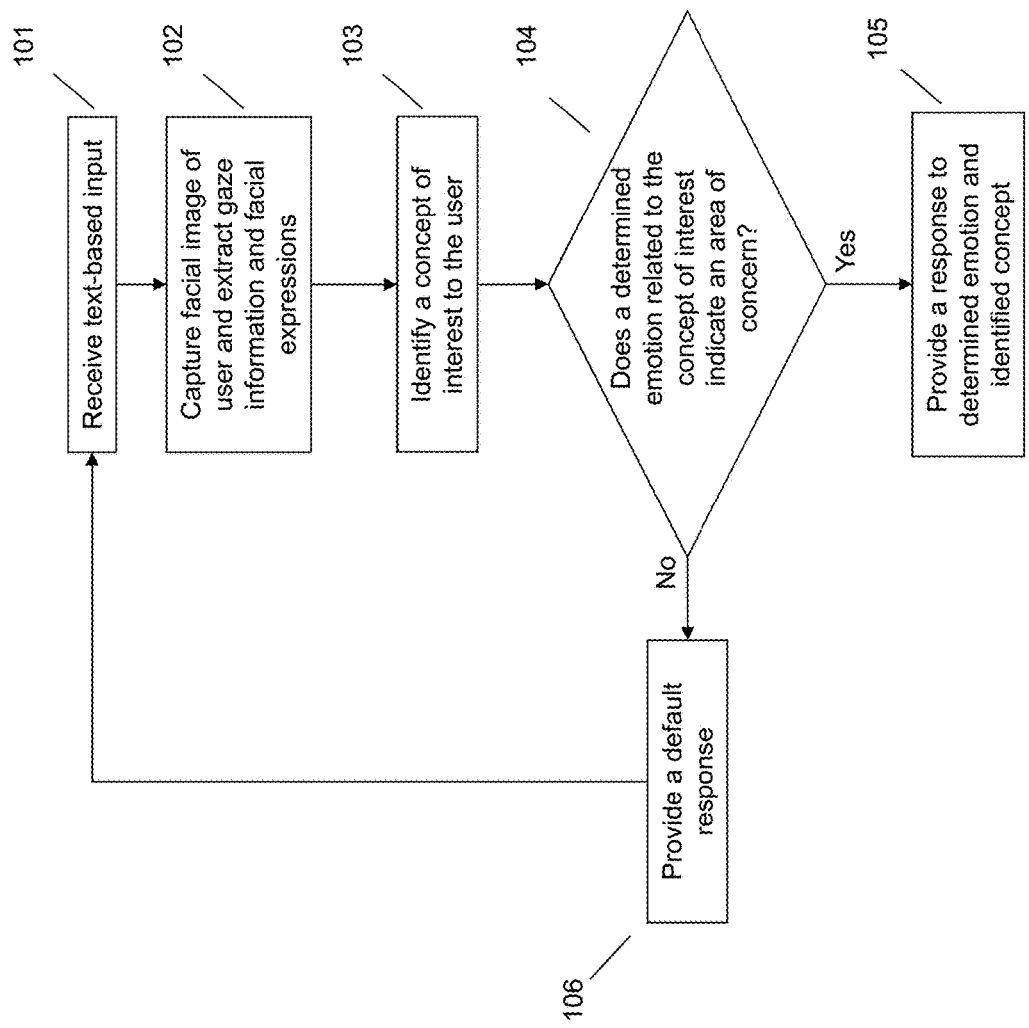
FIG. 1 illustrates a method of augmenting a conversational agent based upon user gaze and emotion.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

The artificial intelligence that chatbots (also known as conversational agents, automated instant messaging systems, virtual assistants, etc.) use allow the conversation to become more accurate and closer to a human-like or natural conversation with another person. For example, the natural language generation and understanding has improved so that the chatbot system can more accurately identify the user request or concern and provide a more accurate response or result.

Some problems with traditional chatbots are that: the traditional chatbot conversation is typically very cumbersome resulting in very lengthy chats to reach the desired outcome, and the chatbot is programmed in a particular manner which can result in ambiguous conversations. For example, the chatbot is programmed to respond to certain queries in a particular manner, which can result in lengthy chats in order for a user to get the desired information. For example, a user may order shoes and may want to know why the shoes have not arrived. Thus, the user may utilize a chatbot to inquire as to the reason why the delivery date of the shoes has passed. The chatbot may first provide a tracking number for the delivery, which does not answer the user's query. The chatbot may then provide a series of questions and responses that eventually answer the actual question of the user.

Another issue with traditional chatbots is the inability to read the body language of a user. In other words, a problem with traditional chatbots is that the chatbot does not detect and respond to user emotion which may identify a concern or intent of the user. Traditional chatbots also only capture text-based input from the user. Thus, another problem is that the chatbot does not have the ability to capture additional inputs of the user that may allow the chatbot to receive or capture more information regarding the user. These additional inputs may provide a way for the chatbot to identify a point in the conversation in which the user may have the most concern.

As may be the case in email, emotion and face-to-face interaction with a chatbot interface is often lost. A chatbot may only respond to a question, without utilizing additional user inputs that may be useful in providing a better experience for the user. For example, if a user queries as to why shoes that were to be delivered have not arrived, the chatbot will respond with a generic apology and not be able to identify the area of conversation the user becomes fixated or concerned about, nor will the chatbot determine an emotion of the user. Traditional automated instant message based conversation agents may be modeled on session dynamics including text elements, embedded topics, meanings, semantics, and/or temporal aging (how far back in conversation), which assist the conversation agents in responding to a user. However, the temporal aging is usually short in time, which means that the chatbot will respond to the text that most closely precedes the chatbot response. For example, a user may inquire about a delivery date and the chatbot may respond with a generic answer. As the conversation continues, the chatbot is naïve to the fact that the user continues to see the inquiry of a delivery time as the user's main concern. Thus, the user's human reaction is lost to the chatbot and uncaptured in the automated conversation. This results in a lost opportunity of the chatbot to assuage the concern of the user and possibly generate additional orders or revenue.

Accordingly, an embodiment provides a system and method for augmenting the chatbot interface allowing capturing of additional user inputs, for example, eye gaze, facial expressions, emotions, and the like, to provide an improved conversational experience for a user. The system may utilize eye gaze tracking to identify a position in the conversation that may be a point of concern to the user. For example, if a user queries a chatbot about the late arrival of an order and the chatbot responds that there was a "technical glitch," the chatbot may receive or capture input that a user's gaze focuses on the term "technical glitch" in the conversation. Accordingly, the chatbot may use this additional input to address the user's concern. Additionally or alternatively, the system may capture and use images of the user to determine a facial expression or emotion of a user. For example, if the chatbot responds to a user query and the user's facial expression changes from neutral to angry or upset. The chatbot may receive this additional input of the change in facial expression and may identify at what point in the conversation the change occurred to better respond to the user.

The system may capture a facial expression and map the facial expression to an emotion of the user. For example, the system may compare the facial expression to a database of standard facial expression having a corresponding emotion. The facial expression may be compared to either historical facial expressions of the user or facial expressions of other users from the same or previous chatbot sessions. Once the chatbot identifies the facial expression change, the system may use the gaze tracking to identify the position within the conversation that caused or preceded the facial expression change. For example, the gaze tracking may provide or be used to identify x-y coordinates of the user gaze to determine a point or location on a display of the user's gaze. The coordinates can then be mapped to a portion or location of the conversation corresponding to a concern of the user. Based upon the gaze tracking and/or facial expression inputs, the system updates or changes a response that may be have been provided in a traditional chatbot system, to address the users concerns. Alternatively, the system may identify that a user gaze fixates upon a word or concept, with or without facial expression, and the system interprets the gaze as a concern by the user regarding that word or concept.

Such a system provides a technical improvement over current chatbot systems. The systems and methods as described herein provide a chatbot interface that captures additional user input allowing the chatbot to provide a better user experience. Additionally, the chatbot may maintain a user emotion or concern over the temporal span of the conversation such that the chatbot may continue to address the user concern. Using gaze tracking and facial expression, the chatbot may determine when the user becomes concerned with a conversational topic and continue to address the concern throughout the conversation even though the conversation may shift to other topics. The augmented chatbot can be applied to any application, which tailors a chatbot response in accordance with a user's emotional state. Accordingly, the systems and methods as described herein provide an augmented chatbot interface which receives emotional data, unlike previous chatbot interfaces.

Referring now to FIG. 1, at 101, the system may receive, at a conversation agent, a text-based conversation between the user and the conversation agent. The conversation agent may be an interactive virtual agent that communicates with a user using a text-based communication method, for example, a virtual assistant, automated instant messaging systems agent, chatbot, or the like. While the input provided to the chatbot window may be a text-based input, the text-based input may either be text-based input or may be derived from another input method, for example, voice input, touch-based input, or the like.

The conversation agent may be part of an application that allows a user to provide input or a query into the application, for example, in a communication window. The conversation agent then responds to the input. This conversation agent and application is intended to mimic a conversation between human users. As an example, the user may access an instant messaging customer service application that allows the user to communicate with a virtual assistant and request customer service assistance, for example, assisting the user in purchasing a particular item, assisting the user with technical issues, assisting the user with questions, or the like.

The communications window may be similar to a messaging application window or other applications in which a user communicates with another entity. The communications window may be a split window that allows space for communication between the user and conversation agent, or may be a window that arranges the communication in a temporal manner. For example, the latest communication from the conversation agent or the user is displayed at the bottom of the window. A blank space or additional window may be provided for the user to input a query to be assessed by the conversational agent. The window may contain other functionalities associated with the conversation.

At 102, the system may capture a facial image of a user. The system may use an image capture device (e.g., camera, video camera, etc.) to capture an image of the user. The image capture device may be attached or operatively coupled to the information handling device the user is using to provide input to the conversational agent. The system may then access the image capture device to request capturing of images of the user. Alternatively, the image capture device may be located at a location unattached to the information handling device but accessible by the system. For example, a user may have a camera within the room that is not attached to or operatively coupled to the information handling device, but is accessible by the system. Before capturing images of the user, the system may notify the user that images will be captured and request that the user allow the capturing of the images or access to the image capture device. The system may analyze the image to extract eye gaze information and/or facial expressions of the user.

At 103, the system may identify a concept of interest to the user within the conversation. A concept of interest may include identifying a position within the conversation that appears to be of interest to the user and then determining the concept associated with that position. To identify the position within the conversation, the system may use the eye gaze information and, based upon parameters of the eye gaze information, determine that a particular position is of interest to the user. The eye gaze information may provide X-Y coordinates associated with the position of the gaze of the user. In other words, the system may use the eye gaze information to determine the X-Y coordinates on the display corresponding to where the user is looking.

The system may then parse the text corresponding to that location on the display and identify the topic or concept of that text. Identifying the topic or concept may include using natural language analysis techniques, for example, tokenizing words or phrases, identifying syntaxes, performing phrase chunking, and the like. These natural language analysis techniques may then be used to identify the concept or topic of interest. The natural language analysis techniques may also be used to determine the mood of the user based upon the provided text. As an example, a conversational agent may handle multiple queries or strings of a conversation in one session. For example, a user may be concerned about a delivery date and then go on to inquire about another purchase. The system may parse the conversation to better differentiate the portion of the conversation during which the user is most concerned. The system may parse the conversation such that the topic of concern identified through gaze or emotional expression may be identified and isolated or integrated into a response with another user query.

One eye gaze parameter that may be used to determine an area of interest to the user may include the saccadic eye movements of the user. Saccadic eye movements are movements of the eyes between viewing positions. For example, as a user looks at a particular object, the user's eye may move between different positions of the object. The saccadic eye movements may identify locations of interest to the user. Accordingly, an embodiment may use the saccadic eye movements to identify locations within the conversation that the user gaze is detected. For example, the system may identify a concept based upon the number of times the user gaze correlates to a particular location within the conversation. As an example, if the user continues to look back-and-forth between the current point in the conversation and an earlier point in the conversation, the system may identify the earlier point as a possible point of interest of the user. If the number of times exceeds a predetermined threshold, the system may identify this as a concept of interest. Alternatively, the position may be identified as a position of interest based upon a proportion. For example, if the user looks at a particular point in the conversation more frequently than another point, the system may identify that point as a potential concept of interest.

The system may also use eye fixations to identify a concept of interest. For example, the system may identify a position within the text-based conversation where the gaze of the user occurs a predetermined number of times. In other words, the system may determine the frequency at which a user gazes upon an at least one conversation area. For example, if a user gaze correlates to a particular area of the conversation many times, then system may identify the position and correlate it to a topic of concern to the user. The number of times to identify a topic may be a predetermined number of times or a threshold, or may be a proportional calculation. The system may also use the eye fixations to identify areas having a high number of fixations, as discussed above, or an area where the fixation is located for a predetermined length of time. For example, the system may identify an area of interest only if the user gaze correlates to the area of text for a certain amount of time. In other words, the system may determine how long or the latency for which the user focuses on an at least one area of the conversation. The threshold may be defined prior to the chatbot session or be dynamically adjusted during a chatbot session. In other words, the system may have a threshold that identifies a point at which the user may be concerned about a topic. Alternatively, a user may only gaze at one area briefly, but since the user has not gazed at any other areas, even a brief gaze may identify an area of concern in the text-based conversation.

The system may also use a combination of parameters to identify an area of concern. For example, the system may calculate a probability corresponding to concepts within the text based conversation and identify a concept having a probability exceeding a predetermined threshold. In other words, the system may identify areas within the conversation that may be associated with an area of concern. The system may then calculate a probability identifying how likely that the position is an area of concern of the user. If the probability exceeds a predetermined threshold, the system may identify the position in the conversation corresponding to the probability as an area of concern.

The probability may be based upon a number of factors, for example, the parameters as discussed above. For example, the probability may be based upon a number of fixations and saccades. As an example, the system may determine the number of fixations, the length of fixations, how many incoming/outgoing saccades, the distance between saccades, the total distance of incoming saccades, and also use traditional factors (e.g., user mood derived from text usage, embedded topics, semantics, temporal aging of the topics, etc.) to identify a possible area of concern. If the probability is greater than a predetermined threshold, the system may identify the area as an area of concern. The probability may be calculated for a user or a plurality of users. For example, the system may use historical knowledge of the particular user to compare the parameters of the current conversation to parameters associated with previous conversations. When the parameters of the current conversation exceed the parameters of the historical conversations, the system may identify that area as an area of concern. The system may conduct a similar comparison with a group of users. In order to provide a more targeted group, the users may be grouped based upon factors such as spending habits, personal profiles, purchase history, customer satisfaction, conversation topic, or the like, and the user of the current conversation may be compared against a group of similar users.

At 104, the system may determine if a facial expression of the user indicates that the identified topic of interest should be considered an area of concern or should be addressed by the system. The system may analyze the facial expression of the user to identify or determine an emotion of the user. For example, once the system identifies an area of interest, the system may capture or access the facial expression of the user to determine if the user is concerned or otherwise interested in the particular point in the conversation. The system may capture or access the facial expression of the user and map the facial expression to an emotion. To determine the emotion, the system may compare the facial expression of the user to a database, or other data storage location having a collection of information, including facial expressions having a corresponding emotion. In other words, the database may indicate a correlation between a particular facial expression and a particular emotion. The database including these correlations may be unique to the particular user. For example, the database may include historical information regarding facial expressions and corresponding emotions for the user providing input. Alternatively, the database may include information regarding a plurality of users. For example, the database may include facial expressions and corresponding emotions for users having similar traits to the user providing input (e.g., similar geographical location, similar ethnicity, similar age, etc.).

If the system does not find a position within the conversation that should be considered an area of concern or interest, the system may not detect an area of the conversation as a concern to the user, and the system may provide a default response at 106. The system may continue to receive input for the conversation, gaze, and facial expressions at 101. If, however, the system identifies an area of concern for a user based upon gaze and/or facial expression, then the system may provide a response at 105 that addresses or responds to the area of concern. The emotion and corresponding point in the conversation identified with the gaze information may assist the system in determining if the user is concerned or otherwise interested in the particular area.

In other words, based upon the identified area of gaze fixation by the user and/or the identified emotion, the system may identify an area of the conversation that should be addressed. For example, if the system determines that a user may be angry, concerned, skeptical, confused, or displaying a different emotion regarding a particular point within the conversation, the system may provide a response that can address this emotion of the user. As an example, the system may directly address the area of concern. For example, if the delay in a shipment occurred due to a "system glitch," and the system identifies that this is an area of concern for the user, the conversational agent may reassure the user that such an issue will not occur on a subsequent order providing a more effective response. The response may be immediate, later, or throughout the conversation. For example, the conversation agent may provide this response after the "system glitch" output, later in the conversation when the system determines that the user keeps looking at this term, or at a different time.

In generating the response, the system may provide a text-based response that includes a text concept that addresses the area identified as a possible area of concern. The system may identify the area of concern using the gaze features (e.g., fixations, saccades, etc.) and/or emotional responses to the area of concern. The system may determine the text concept that is included in the area of concern, for example, using traditional text parsing, natural language analysis techniques, semantic/syntactic analysis, or the like. After identifying the text concept of concern, the system may identify a standard response that would be associated with that text concept. Then, based upon the identified emotion or based upon identifying an area as an area of concern, the system may modify the standard text response to reflect the emotion or area identified as concerning to a user. In other words, the conversational agent may provide a text response including a text concept that specifically addresses the area identified as an area of concern and is responsive to or formulated in view of the determined emotion. As an example, if the system determines that a user is angry about a particular response provided by the conversational agent, the agent may provide a response that directly addresses the fact that the user is angry and addresses the concept that the user is angry about.

Figure 2:
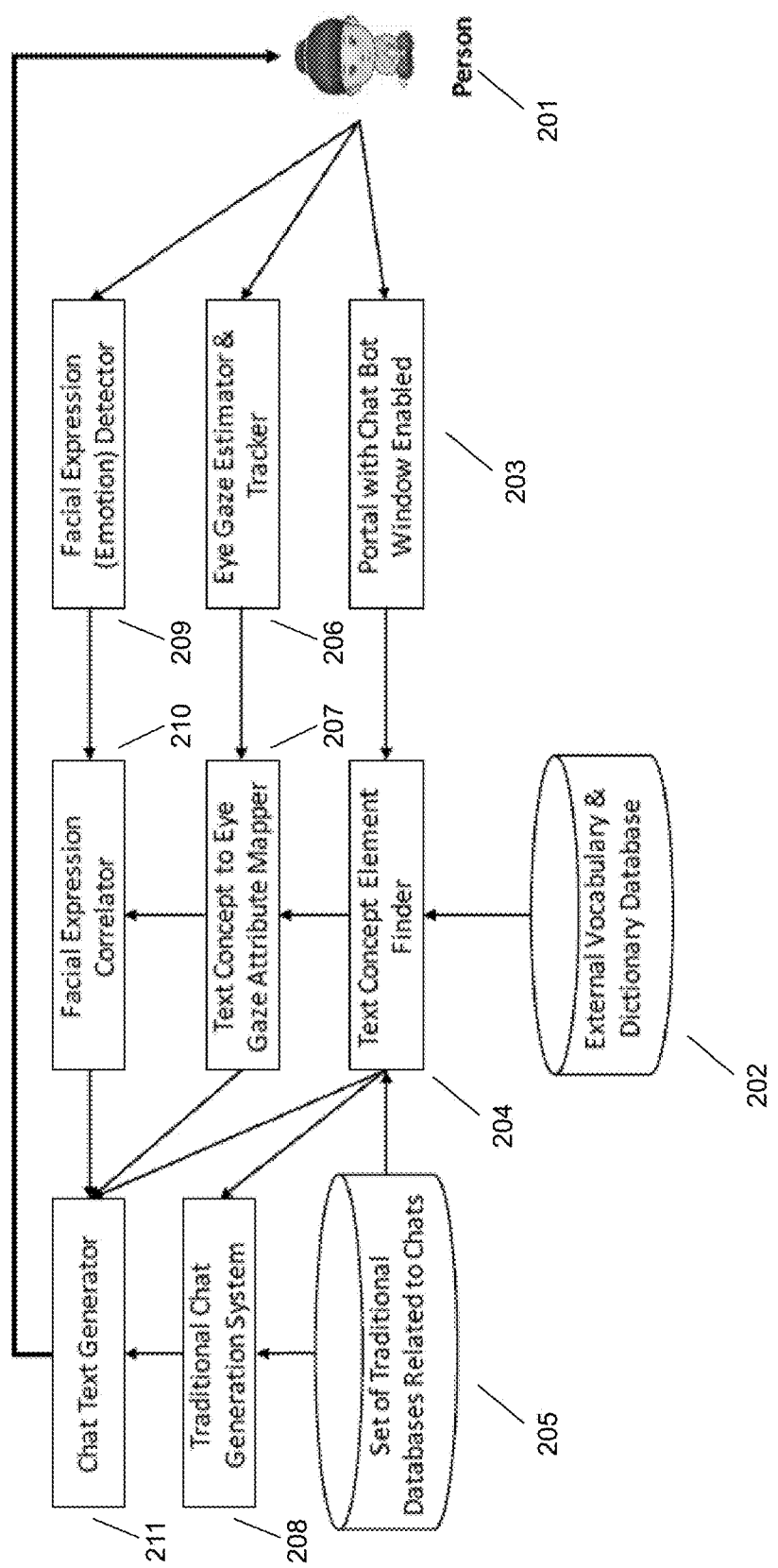
FIG. 2 illustrates an example use case of an augmented system-generated chat text sent to a user over a conversational agent.

FIG. 2 illustrates an example use case of a system architecture diagram of an augmented system-generated chatbot text. In an embodiment, the system architecture receives input in the form of facial expression and/or eye gaze tracking/estimator, along with the text-based input provided by the user, to generate a chatbot reply. For example, a user may query the chatbot about an overdue delivery date. While conversing with the user, the system, in addition to receiving a text-based input from the user, may also collect data pertaining to the eye gaze and facial expression of the user.

In an embodiment, the system may capture text input, eye gaze information, and facial expressions from a user 201. The text input may be provided to the chatbot window or application 203. The text may then be provided to a text concept element finder module 204 that uses external vocabulary and dictionary resources 202 to identify concepts or topics within the provided text. For example, the text concept element finder module 204 may use natural language analysis techniques to identify concepts within the text. The text concept element finder module 204 may also access traditional databases related to chats 205 to assist in identifying concepts within the text, for example, databases related to moods of users based upon text, temporal aging databases, and the like.

The eye gaze information may be provided to an eye gaze estimator and tracker module 206. As discussed above, this module may identify the location of the user gaze within the conversation. The eye gaze position information may be provided to a text concept to eye gaze attribute mapper module 207 which can identify a concept of interest to the user. The text concept to eye gaze attribute mapper module 207 may also receive input from the text concept element finder module 204 that has identified the concepts within the text. The text concept to eye gaze attribute mapper module 207 may user the position of the user gaze to identify the concept of interest.

The facial expressions may be provided to a facial expression (emotion) detector module 209. The facial expression (emotion) detector module 209 may identify or capture the facial expression of the user and then provide this information to a facial expression correlator module 210 that can identify the emotion of the user. The facial expression correlator module 210 may also receive as input the identified concept of interest from the text concept to eye gaze attribute mapper module 207.

The system may also use a traditional chat generation system 208 to provide responses to the user, for example, in response to queries or other input from the user. The traditional chat generation system may receive input from the traditional databases related to chats 205 and the text concept element finder module 204 to respond to queries of the user. The system may then augment this traditional chat generation system 208 by providing responses that are directed to identified areas of concern, for example, by the text concept to eye gaze attribute mapper 207, and identified emotions of the user, for example, by the facial expression correlator 210 using the chat text generator 211 as described herein. These responses that specifically address the area of concern can then be provided back to the user 201.

As should be understood by one skilled in the art, the system architecture as shown in FIG. 2 is merely an example. Additionally, it should be noted that the defined levels of the system may interface with one another both forwards and backwards, and elements within a level may interact with elements of the same or different levels to provide a conversational agent response tailored to gaze and facial expression data.

Accordingly, the augmented conversational agent may use factors such as eye gaze and/or facial expressions of the user captured at temporal points and correlated to concepts identified in the text to generate text by a conversational agent that addresses the area of concern for the user. Enhanced eye gaze factors and facial expression factors correlated to conversation text allows for a better response from the conversational agent and leads to an enhanced user experience.

Figure 3:
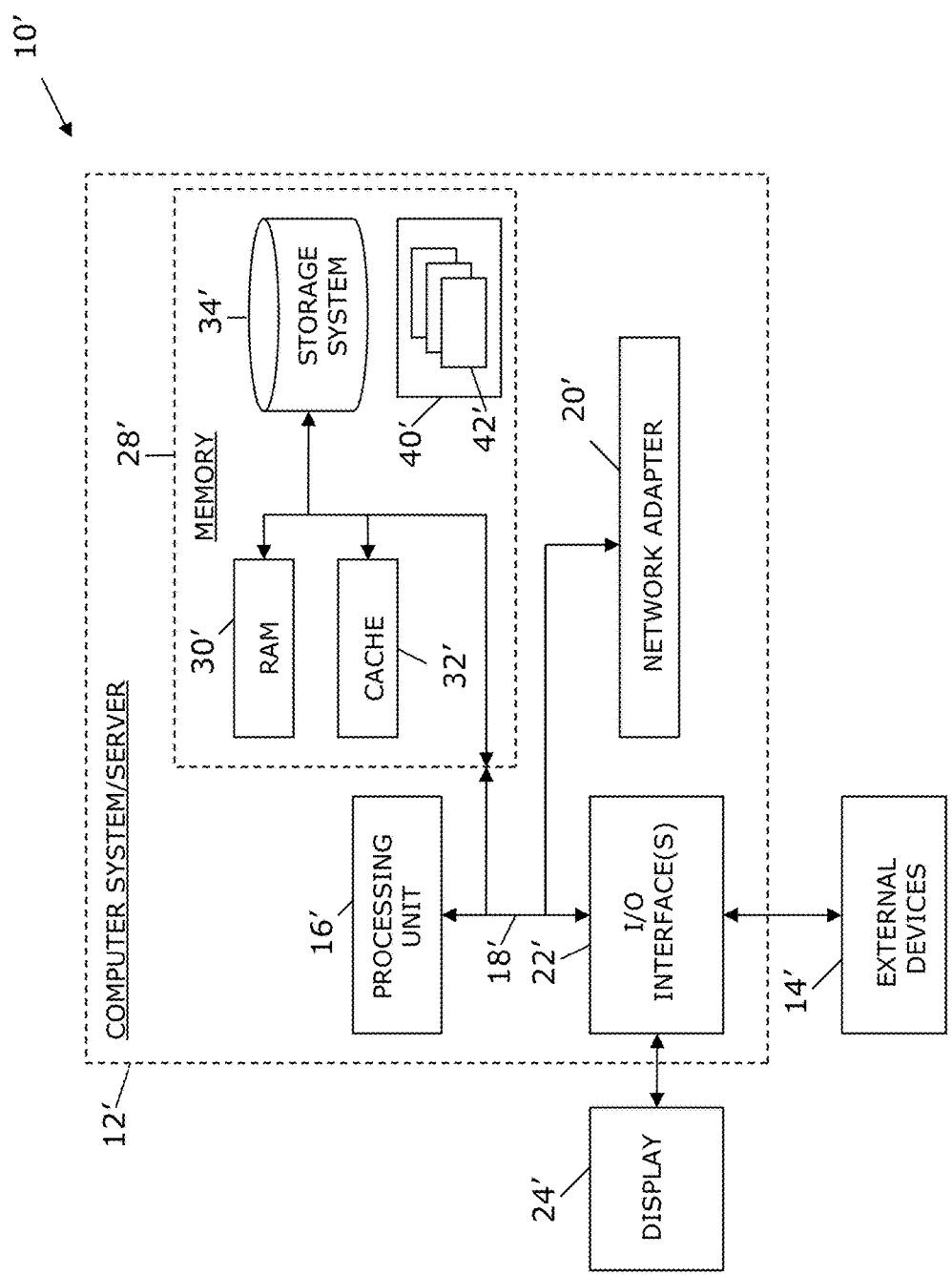
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving, at a conversation agent, text-based input from a user and beginning a text-based conversation between the user and the conversation agent, wherein the conversation agent comprises an interactive virtual agent that communicates with the user using a text-based communication method;
capturing at least one facial image of the user and analyzing the facial image to extract eye gaze information and facial expressions of the user;
identifying, within the text based conversation between the conversation agent and the user, a concept of interest to the user, wherein the identifying comprises analyzing the eye gaze information to identify a position within the text-based conversation and determining the concept corresponding to the position within the text-based conversation;
determining an emotion of the user in relation to the concept of interest, wherein the determining an emotion comprises analyzing the facial expressions of the user; and
providing, from the conversation agent, a text-based response to the user, wherein the text-based response is formulated in view of the determined emotion and the identified concept of interest.

2. The method of claim 1, wherein the identifying a concept of interest comprises mapping the saccadic eye movements included in the eye gaze information to a concept within the text-based conversation.

3. The method of claim 1, wherein the identifying a concept comprises identifying a position within the text-based conversation based on an attribute of the gaze of the user selected from the group consisting of: latency and frequency.

4. The method of claim 1, wherein the providing a text-based response comprises correlating the determined emotion to the identified concept of interest and generating a text-based response comprising a text concept corresponding to the identified concept of interest and formulated in view of the determined emotion.

5. The method of claim 1, wherein the identifying a concept comprises calculating a probability corresponding to concepts within the text-based conversation and identifying a concept having a probability exceeding a predetermined threshold.

6. The method of claim 5, wherein the probability is based upon a number of fixations and saccades and is computed as an average across a plurality of users.

7. The method of claim 1, wherein the identifying a concept comprises parsing the text-based conversation.

8. The method of claim 1, wherein the determining an emotion of the user comprises comparing the facial expression of the user to a database comprising a plurality of facial expressions and corresponding emotions.

9. The method of claim 8, wherein the database comprises a database unique to the user and is based upon historical facial expressions of the user.

10. The method of claim 1, wherein the providing a text-based response comprises providing a text-based response to address the determined emotion.

11. An apparatus, comprising:
at least one processor; and
a computer readable storage medium having computer readable program code embodied therewith and executable by the at least one processor, the computer readable program code comprising:
computer readable program code that receives, at a conversation agent, text-based input from a user and beginning a text-based conversation between the user and the conversation agent, wherein the conversation agent comprises an interactive virtual agent that communicates with the user using a text-based communication method;
computer readable program code that captures at least one facial image of the user and analyzing the facial image to extract eye gaze information and facial expressions of the user;
computer readable program code that identifies, within the text based conversation between the conversation agent and the user, a concept of interest to the user, wherein the identifying comprises analyzing the eye gaze information to identify a position within the text-based conversation and determining the concept corresponding to the position within the text-based conversation;
computer readable program code that determines an emotion of the user in relation to the concept of interest, wherein the determining an emotion comprises analyzing the facial expressions of the user; and
computer readable program code that provides, from the conversation agent, a text-based response to the user, wherein the text-based response is formulated in view of the determined emotion and the identified concept of interest.

12. A computer program product, comprising:
a computer readable storage medium having computer readable program code embodied therewith, the computer readable program code executable by a processor and comprising:
computer readable program code that receives, at a conversation agent, text-based input from a user and beginning a text-based conversation between the user and the conversation agent, wherein the conversation agent comprises an interactive virtual agent that communicates with the user using a text-based communication method;
computer readable program code that captures at least one facial image of the user and analyzing the facial image to extract eye gaze information and facial expressions of the user;
computer readable program code that identifies, within the text based conversation between the conversation agent and the user, a concept of interest to the user, wherein the identifying comprises analyzing the eye gaze information to identify a position within the text-based conversation and determining the concept corresponding to the position within the text-based conversation;
computer readable program code that determines an emotion of the user in relation to the concept of interest, wherein the determining an emotion comprises analyzing the facial expressions of the user; and
computer readable program code that provides, from the conversation agent, a text-based response to the user, wherein the text-based response is formulated in view of the determined emotion and the identified concept of interest.

13. The computer program product of claim 12, wherein the identifying a concept of interest comprises mapping the saccadic eye movements included in the eye gaze information to a concept within the text-based conversation.

14. The computer program product of claim 12, wherein the identifying a concept comprises identifying a position within the text-based conversation based on an attribute of the gaze of the user selected from the group consisting of: latency and frequency.

15. The computer program product of claim 12, wherein the providing a text-based response comprises correlating the determined emotion to the identified concept of interest and generating a text-based response comprising a text concept corresponding to the identified concept of interest and formulated in view of the determined emotion.

16. The computer program product of claim 12, wherein the identifying a concept comprises calculating a probability corresponding to concepts within the text-based conversation and identifying a concept having a probability exceeding a predetermined threshold, wherein the probability is based upon a number of fixations and saccades and is computed as an average across a plurality of users.

17. The computer program product of claim 12, wherein the identifying a concept comprises parsing the text-based conversation.

18. The computer program product of claim 12, wherein the determining an emotion of the user comprises comparing the facial expression of the user to a database comprising a plurality of facial expressions and corresponding emotions, wherein the database comprises a database unique to the user and is based upon historical facial expressions of the user.

19. The computer program product of claim 12, wherein the providing a text-based response comprises providing a text-based response to address the determined emotion.

20. A method, comprising:
utilizing at least one processor to execute computer code that performs the steps of:
initiating, upon receipt of input by a user, text-based conversational session between an interactive virtual agent and the user, wherein the interactive virtual agent communicates with the user using a text-based communication method;
determining a facial expression of the user by capturing, using at least one image capture device, at least one facial image of the user;
identifying, within the text based dialog between the virtual agent and the user, a portion of the dialog of interest to the user, wherein the identifying comprises accessing eye gaze information contained within the at least one image and identifying a location within the text based dialog corresponding to a position of the gaze of the user;
determining an emotion of the user in relation to the portion of the dialog of interest, wherein the determining an emotion comprises comparing the determined facial expression of the user to known facial expressions having a corresponding identified emotion; and
providing, from the virtual agent, a text-based response to the user by correlating the determined emotion to the identified concept of interest and generating a text-based response comprising a text concept corresponding to the identified concept of interest and formulated in view of the determined emotion.

\* \* \* \* \*